United States Patent
Caldwell et al.

(10) Patent No.: US 10,473,758 B2
(45) Date of Patent: Nov. 12, 2019

(54) UNIVERSAL COHERENT TECHNIQUE GENERATOR

(71) Applicant: Raytheon Company, Waltham, MA (US)

(72) Inventors: Jeffrey Caldwell, Hermosa Beach, CA (US); Harry B. Marr, Jr., Manhattan Beach, CA (US); Ian S. Robinson, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 649 days.

(21) Appl. No.: 15/091,988

(22) Filed: Apr. 6, 2016

(65) Prior Publication Data

US 2017/0293019 A1 Oct. 12, 2017

(51) Int. Cl.
*G01S 7/38* (2006.01)
(52) U.S. Cl.
CPC ..................... *G01S 7/38* (2013.01)
(58) Field of Classification Search
CPC .......................................... G01S 7/38
USPC .......................................... 342/14
See application file for complete search history.

(56) References Cited

U.S. PATENT DOCUMENTS

| | | | |
|---|---|---|---|
| 4,217,580 A | 8/1980 | Lowenschuss | |
| 4,743,905 A | 5/1988 | Wiegand | |
| 4,891,646 A | 1/1990 | Wiegand | |
| 4,990,920 A | 2/1991 | Sanders, Jr. | |
| 5,003,312 A | * 3/1991 | Madni | G01S 7/38 327/231 |
| 5,287,110 A | 2/1994 | Tran | |
| 5,899,923 A | 5/1999 | Kroll et al. | |
| 5,963,164 A | 10/1999 | Tsui et al. | |
| 6,308,228 B1 | 10/2001 | Yocum et al. | |

(Continued)

FOREIGN PATENT DOCUMENTS

| | | |
|---|---|---|
| CA | 1119702 | 3/1982 |
| CN | 102830637 | 12/2012 |

(Continued)

OTHER PUBLICATIONS

"International Application Serial No. PCT/US2017/025890, International Search Report dated Jul. 12, 2017", 5 pgs.

(Continued)

*Primary Examiner* — Peter M Bythrow
*Assistant Examiner* — Helena H Seraydaryan
(74) *Attorney, Agent, or Firm* — Schwegman Lundberg & Woessner, P.A.

(57) ABSTRACT

Devices and methods of providing response pulses in response to threat pulses are general described. The threat pulses are detected, identified and validity determined using reprogrammable firmware. Threat pulses are extracted from memory and the amplitude, frequency, phase, length and timing modified to generate a coherent set of superposed response pulses in response to the threat pulses. The modifications are calculated in situ using parameterization, rather than being based on tables. Multiple response pulses in response to different threat pulses are simultaneously generated, combined and transmitted in a single channel. Partial pulse capability and the capability to create a weighted and modulated composition of multiple response pulses is provided.

18 Claims, 4 Drawing Sheets

(56) References Cited

U.S. PATENT DOCUMENTS

| | | | |
|---|---|---|---|
| 6,327,498 | B1 | 12/2001 | Kroll |
| 6,448,921 | B1 | 9/2002 | Tsui et al. |
| 6,640,334 | B1 | 10/2003 | Rasmussen |
| 6,721,358 | B1 | 4/2004 | Pace et al. |
| 7,145,504 | B1 | 12/2006 | Newberg et al. |
| 7,475,080 | B2 | 1/2009 | Chowdbary et al. |
| 7,657,313 | B2 | 2/2010 | Rom |
| 7,982,654 | B2 | 7/2011 | Low |
| 7,987,449 | B1 | 7/2011 | Marolia et al. |
| 8,224,234 | B1 | 7/2012 | Schuster et al. |
| 8,341,099 | B2 | 12/2012 | Khosravy |
| 8,365,205 | B2 | 1/2013 | Chen et al. |
| 8,392,149 | B1 | 3/2013 | Spencer et al. |
| 8,494,464 | B1 | 7/2013 | Kadambe et al. |
| 8,510,240 | B2 | 8/2013 | Patrao et al. |
| 8,555,273 | B1 | 10/2013 | Chia et al. |
| 2002/0181415 | A1 | 12/2002 | West et al. |
| 2002/0184385 | A1 | 12/2002 | Kato |
| 2004/0201518 | A1 | 10/2004 | Pace et al. |
| 2006/0001568 | A1 | 1/2006 | Alford et al. |
| 2006/0088137 | A1* | 4/2006 | Jiang ............... H03L 7/00 375/371 |
| 2007/0156190 | A1 | 7/2007 | Cinbis |
| 2008/0091815 | A1 | 4/2008 | Rao |
| 2008/0191924 | A1 | 8/2008 | Duff et al. |
| 2008/0195693 | A1 | 8/2008 | Gao et al. |
| 2008/0297394 | A1 | 12/2008 | Dark et al. |
| 2009/0061759 | A1* | 3/2009 | Stoddard ............ H04K 3/41 455/1 |
| 2009/0290623 | A1* | 11/2009 | Gray ............... H04L 1/243 375/221 |
| 2010/0169876 | A1 | 7/2010 | Mann |
| 2010/0234906 | A1 | 9/2010 | Koh |
| 2010/0283657 | A1* | 11/2010 | Vollin ............... F41G 7/224 342/14 |
| 2011/0309981 | A1 | 12/2011 | Huizing |
| 2012/0211563 | A1 | 8/2012 | Gannon et al. |
| 2013/0185094 | A1 | 7/2013 | Mukerji et al. |
| 2014/0122862 | A1 | 5/2014 | Ludwig et al. |
| 2014/0362774 | A1* | 12/2014 | Marr ............... H04K 3/42 370/329 |
| 2017/0147321 | A1 | 5/2017 | Marr, Jr. et al. |

FOREIGN PATENT DOCUMENTS

| | | | |
|---|---|---|---|
| GB | 2286308 | | 8/1995 |
| TW | 201737649 A | | 10/2017 |
| WO | 2005103978 | | 11/2005 |
| WO | 2011125060 | | 10/2011 |
| WO | WO-2011125060 A2 * | 10/2011 | ............... G01S 7/38 |
| WO | 2017176710 | | 10/2017 |

OTHER PUBLICATIONS

"International Application Serial No. PCT/US2017/025890, Written Opinion dated Jul. 12, 2017", 7 pgs.

"U.S. Appl. No. 14/945,992, Non Final Office Action dated Aug. 11, 2017", 12 pgs.

Chakravarthy, Vasu, et al., "Cognitive Radio—an Adaptive Waveform with Spectral Sharing Capability", Wireless Communications and Networking Conference, IEEE, vol. 2,, (2005), 724-729.

Roome, S J, "Digital radio frequency memory", Electronics & Communication Engineering Journal, vol. 2, No. 4, (Aug. 1990), 147-153.

Schleher, D Curtis, "Section 1.3.2 The Effect of EA on Tracking Radar", Electronic Warfare in the Information Age (1st ed.), Artech House, Inc., (1999), 20-24.

Schleher, D Curtis, "Section 5.5 Advanced DRFM Architecture", Electronic Warfare in the Information Age (1st ed.), Artech House, Inc., (1999), 324-326.

Schleher, D Curtis, "Sections 3.3.2 to 3.4 Deception Jamming", Electronic Warfare in the Information Age (1st ed.), Artech House, Inc., (1999), 167-182.

Schleher, D Curtis, "Sections 5 to 5.1 Digital Radio Frequency Memory", Electronic Warfare in the Information Age (1st ed.), Artech House, Inc., (1999), 293-300.

Spezio, Anthony, "Electronic Warfare Systems", Microwave Theory and Techniques, IEEE Transactions on, vol. 50, No. 3, (Mar. 2002), 633-644.

"U.S. Appl. No. 14/945,992, Notice of Allowance dated Jan. 8, 2018", 13 pgs.

U.S. Appl. No. 14/945,992, filed Nov. 19, 2015, Dynamic Interface for Firmware Updates.

"U.S. Appl. No. 14/945,992, Response filed Dec. 11, 2017 to Non Final Office Action dated Aug. 11, 2017", 13 pgs.

"Taiwanese Application Serial No. 106108932, Office Action dated Feb. 22, 2018", w English translation.

"Gulf Cooperation Council Application Serial No. 2017/33164, Office Action dated Mar. 15, 2019", 5 pgs.

* cited by examiner

UNIVERSAL COHERENT TECHNIQUE GENERATOR

TECHNICAL FIELD

Embodiments pertain to secure reception and generation of radio waveforms. Some embodiments relate to parameterized generation of waveforms and control of waveform reception.

BACKGROUND

Electronic Warfare (EW) systems process massive amounts of Radio Frequency (RF) data in short periods of time and play an increasingly important role in modern warfare. It is not uncommon for an airborne EW system to process well over a million pulses in a single second continuously throughout a mission. The data processed by the EW system may include both threat-related and non threat-related RF signals. Consequently the complexity of the EW responses to threat waveforms is growing exponentially and a technique is desired to quickly create customized and sometimes complex EW responses, or jamming, in real time.

In most circumstances, it may be desirable for the EW system to be able to respond to numerous existing RF threats as well as respond quickly to new RF threats. The use of radar techniques to detect vehicles are becoming increasingly advanced, leading to the use of EW techniques to counter the more advanced radars. It would be desirable to be able to further enhance the existing ability to provide EW countermeasures.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
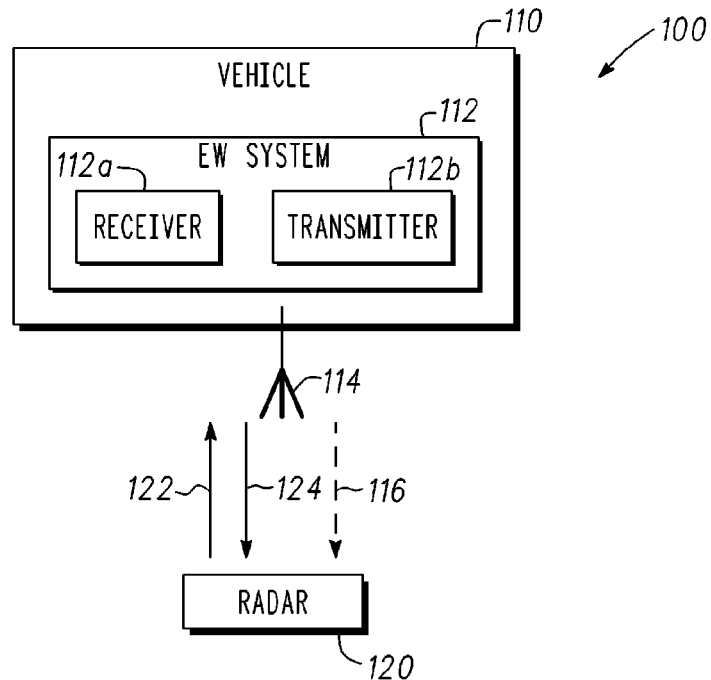
FIG. 1 is a functional block diagram illustrating a communication system in accordance with some embodiments.

FIG. 1 is a functional block diagram illustrating a communication system in accordance with some embodiments. FIG. 1 is a functional block diagram illustrating one embodiment of an RF environment 100 in which vehicle 110 contains EW system 112 and is in the range of radar 120. The EW system 112 may provide coherent technique(s) to respond to different pulses and pulse types from a wide variety of radar sources, including radar 120, via one or more antennas 114. The EW system 112 may capture the pulses from the radar 120 in a pulse catalogue composed into a single modulated pulse train and retransmit pulses as countermeasures.

The EW system 112 may include a receiver 112a to receive threat pulses from RF threats, including radar 120, a transmitter 112b to transmit countermeasures (response pulses) against the RF threats and electronic attack (EA) firmware (shown in FIGS. 3 and 4) that may be separate from or a part of the receiver 112a and a transmitter 112b. The receiver 112a and transmitter 112b may be referred to as a transceiver or transceiver circuitry. Coherent techniques refer to the class of countermeasures in which the EW systems modifies in whole or in part, in one more fashions, the currently received pulse or a previously received pulse(s) and retransmits the modified signal. Modifications may include, but are not limited to, frequency shifts (according to a schema that varies the modification on successive pulses), adding noise (many types, also according to a schema), modulation, re-ordering samples, delaying samples in time (according to a schema), delaying and shifting frequency in a coordinated fashion (according to a schema), and mixing and matching the above in serial, parallel, or both In many cases the techniques rely on an Anticipated Time of Arrival (ATOA), as described in more detail below. Thus, for example, radar 120 may emit a transmission signal 122 that impinges on vehicle 110 and reflects from vehicle 110 as reflection signal 124. Vehicle 110 may absorb transmission signal 122 so that no reflection signal 124 is transmitted back to radar 120, as shown transmit a countermeasure signal 114 to negate reflection signal 124, or take no action, depending on the countermeasure the EW system 112 determines to take.

The EW system 112 may be embedded within vehicle 110, which may be a military land, sea or air vehicle configured to gather intelligence data and perform other missions. During missions, the EW system 112 be used offensively or defensively. For example, the data gathered by the EW system 112 may be used for instantaneous assessment of target systems such as radar 120 to determine whether to take offensive or defensive action against one or more of the target systems. Defensive measures taken may include, for example, jamming the target system to decrease the quality of measurements performed by the system and decrease the chances of detection or targeting by the system. Offensive measures may include more stringent methods of avoiding (e.g., by route alteration of the vehicle) or eliminating the offending systems.

Figure 2:
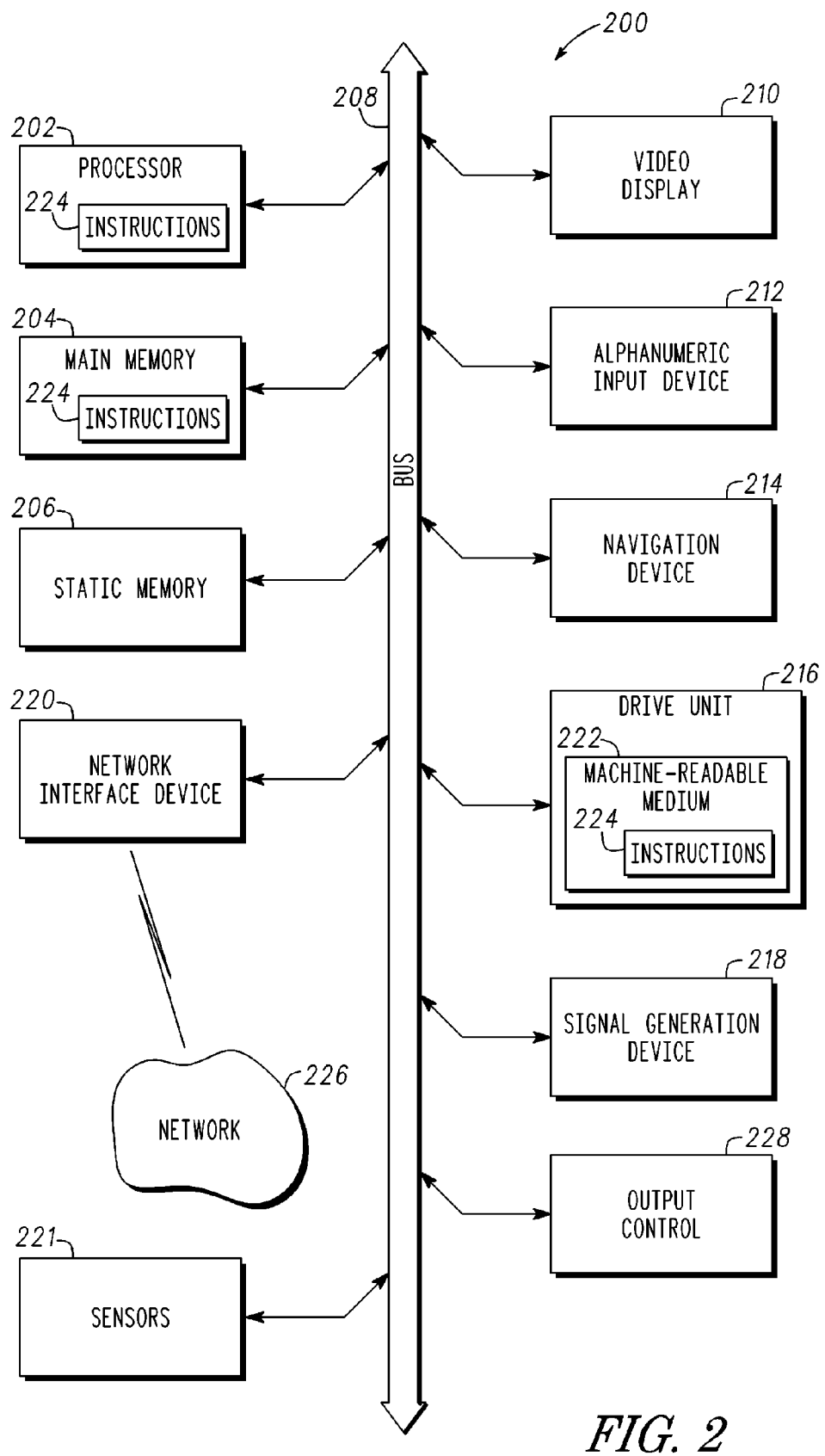
FIG. 2 illustrates a block diagram of a wireless device in accordance with some embodiments.

FIG. 2 illustrates a block diagram of an EW system in accordance with some embodiments. In some embodiments, the EW system 200 may be a computer configured to perform any one or more of the techniques during transaction events discussed herein. In alternative embodiments, the EW system 200 may operate as a standalone device or may be connected (e.g., networked) to other computers. In a networked deployment, the EW system 200 may operate in the capacity of a server, a client, or both in server-client network environments. In an example, the EW system 200 may act as a peer machine in peer-to-peer (P2P) (or other distributed) network environment. The EW system 200 may be a general or specialized computer or any machine capable of executing instructions (sequential or otherwise) that specify actions to be taken by that machine. Although a number of components are shown as being included in EW system 200, some of these components may or may not be present.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The EW system 200 may include a hardware processor 202 (e.g., a central processing unit (CPU), a Field Gate Programmable Array (FPGA), an Application-Specific integrated circuit (ASIC), a graphics processing unit (GPU), a hardware processor core, or any combination thereof), a main memory 204 and a static memory 206, some or all of which may communicate with each other via an interlink (e.g., bus) 208. Although not shown, the main memory 204 may contain any or all of removable storage and non-removable storage, volatile memory or non-volatile memory. The EW system 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The EW system 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The EW system 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the EW system 200. In an example, one or any combination of the hardware processor 202, the main memory 204, the static memory 206, or the storage device 216 may constitute machine readable media.

While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the EW system 200 and that cause the EW system 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

To effect opportunistic use of the EW system, a vast amount of data from target systems may be obtained and processed in situ during a mission. The EW system may obtain signals that originate from known or unknown sources, evaluate the signals based on EW information stored in its memory and determine a desired course of action to either take appropriate measures automatically or indicate to the user one or more actions to take and wait for the user to respond with the appropriate course of action. The EW system may use fully parameterized techniques, rather than continually loading in large tables of data containing, information such as number and type of RF pulses to use, to result in a particular technique. The parameterization may include instructions to be executed over time and/or until new parameters are provided.

The EW system may undertake several different categories of operations in electronic support (ES) and EA techniques. These operations may include, among others, signal detection, signal identification, and signal tracking during ES and technique development, technique selection, parameter tracking and effectiveness during EA. Due to the huge amount of data being processed during a mission, it may be undesirable to offload processing and decision-making processes to achieve the desired real-time operation or to be required to load extensive tables of countermeasures. This may be, in particular, an issue in situations in which an unknown emitter (radar or source of illumination) actively targets or illuminates the vehicle containing the EW system. The decision of whether a particular radar is targeting the vehicle may thus depend on the vehicle detecting illumination (e.g., pulses) received from the emitter at the vehicle.

The information with which the EW system may have to work may be radio frequency signal (e.g., pulse) data. Thus, the RF signals alone may be processed by the EW system to identify the source and determine the nature of the RF signals, whether threatening or non-threatening, and determine the appropriate action to take. However, the EW system may receive a tremendous amount of raw observables—millions of pulses/second—and act upon them in short order. More specifically, the EW system may digitize the pulses, separate and filter the pulses into individual sources using stored sets of parameters, match the sources to known radar, assess ambiguities between the known signals and unknown signals, determine location and probable type and capabilities of each source, and determine and take appropriate countermeasures for each source.

Figure 3:
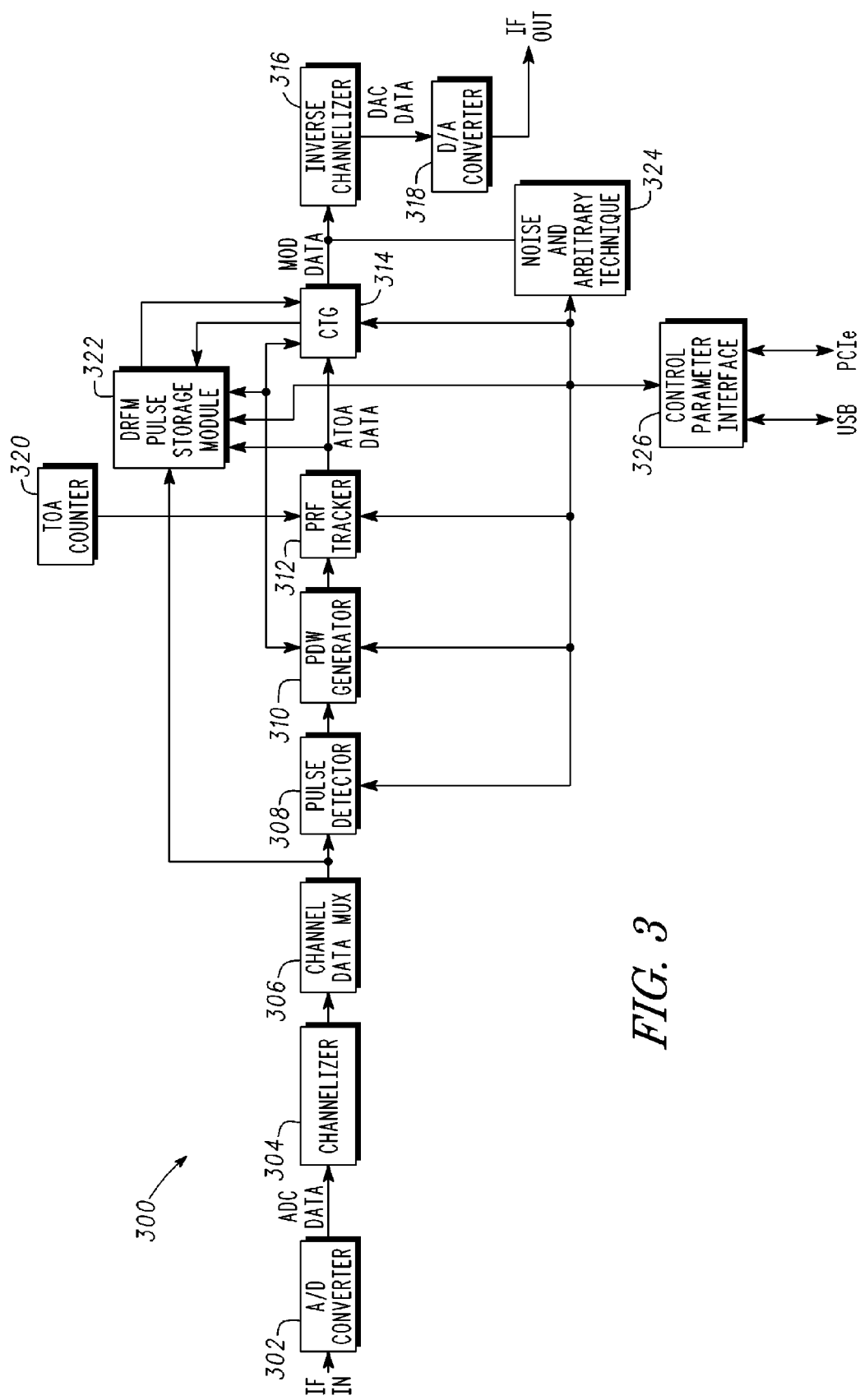
FIG. 3 shows a block diagram of EA firmware architecture according to some embodiments.

FIG. 3 shows a block diagram of EA firmware according to some embodiments. The modules, which in some embodiments may be embodied as circuitry, include an Analog to Digital Converter (ADC) 302, a channelizer 304, a channel data demultiplexer 306, a pulse detector 308, a Pulse Descriptor Word (PDW) module 310, a Pulse Repetition Frequency (PRF) tracker 312, a Universal Coherent Technique Generator (CTG) 314, an inverse channelizer 316, a Digital to Analog Converter (DAC) 318, a Time of Arrival Counter 320, a Digital Radio Frequency Memory (DRFM) pulse storage module 322, a Noise/Technique Generator 324 and a control parameter interface 326. The various modules shown in the EA firmware 300 may be implemented as individual elements in a field programmable gate array (FPGA), software and/or separate hardware. In some embodiments, some of the modules shown, such as the Noise/Technique Generator 324 may not be present. Some of the modules shown in FIG. 3 may further be disabled, for example, the input modules containing the ADC 302, channelizer 304 and demultiplexer 306 may not be active when the receiver shown in FIG. 1 is off.

When the receiver shown in FIG. 1 is active, RF pulses are received by the EW system. The RF pulses may be modulated to an intermediate frequency (IF) using a mixer and filter (not shown) before being passed to the ADC 302. The IF pulses may extend in all or part of baseband to 800 MHz or even beyond 1 GHz, for example. The ADC 302 digitizes the pulses before providing the digitized pulses to the channelizer 304. The channelizer 304 spectrally filters the pulses to create one of sets of pulsed data in a narrow frequency band. The channelizer 304 may programmable, with the number of bins and width selectable. In non-exclusive examples, when the IF range is up to 800 MHz, the channelizer 304 may be selected to have 10 80 MHz bins (e.g., 0 MHz-80 MHz, 80 MHz-160 MHz, ... ), 50 16 MHz bins or 100 8 MHz bins.

The channelizer 304 output, which may be in parallel, is provided to the demultiplexer 306. Thus, a particular bin, and all pulses from the one or more radar sources that fit into the bin, is sequentially selected the demultiplexer 306. Although not shown, at least some of the modules may be provided with a clock signal from a clock to permit synchronized processing of the pulses. In some embodiments, the demultiplexer 306 may be eliminated. The serial output from the demultiplexer 306 is supplied to the pulse detector 308 and the DRFM pulse storage module 322.

The pulse detector 308 may detect whether or not a pulse is present in a predetermined time window. The pulse detector 308 may, for example, detect whether a signal within the time window has reached a predetermined amplitude for a predetermined length of time. The pulse detector 308 may trigger on a rising edge of a pulse.

The PDW generator 310 determines the type of pulse to be generated as a PRF pattern using the pulse properties of the pulse provided from the pulse detector 308. The pulse properties include, for example, pulse width, frequency and amplitude, among others. The pulse detector 308 indicates the pulse properties using a particular codeword of predetermined length.

The PDW output of the pulse detector 308 is supplied to the PRF tracker 312. The PRF tracker 312 determines whether the PRF pattern matches a supplied template within a predetermined tolerance. This is to say that the PRF tracker 312 determines from the pattern of occurrences of the PDW whether the PDW is valid and thus countermeasures are to be taken. The PRF tracker 312 may be able to determine the validity of the PDW from as few as two repetitions of the pulse chain or three occurrences of the pulse (PDW). The PRF tracker 312 may be able to determine the existence of radar pulses from pulses having a high repetition rate (of, e.g., <1 ms). The combination of the PRF tracker 312 and the PDW generator 310 may be duplicated a predetermined number of times.

The PRF tracker 312 provides ATOA data to the CTG 314 and to the DRFM storage module 322. The ATOA data provides a prediction of the timing of the next pulse so that when the receiver is not actively receiving pulses, the EW system can nevertheless predict the arrival of the pulses and respond accordingly. The PDW generator 310, the PRF tracker 312, the CTG 314 and the DRFM storage module 322 are supplied with timing information from the TOA counter 320 so that the PDW generator 310, the PRF tracker 312, the CTG 314 and the DRFM storage module 322 are able to act synchronously and in accordance with the ATOA data. The CTG 314 modifies the current pulse or one or more stored pulses and retransmits them either before or after the ATOA data. In some embodiments, the captured threat pulses may be modified and superposed (or superposed and then modified) such that multiple threat pulses from either the same radar or different radars and having either the same characteristics or different characteristics may be provided in response.

In some embodiments, a Mission Data File is provided to the EA firmware before the start of a mission. The Mission Data File may define each parameter for different techniques in a technique message description document, and the parameters provided via the control parameter interface 326. The Mission Data File may also indicate the expected patterns of PRF for the PRF tracker 312 to use. In some embodiments, the PRF tracker 312 or another tracker may discover the PRF pattern autonomously.

The CTG 314 interprets the parameterized message from the control parameter interface 326 and acts as a technique generator, using several different modifications in series and/or parallel and subsequently summing the result. The parameter values in the message content of the Mission Data File are already in a format that the CTG 314 is able to use. In some embodiments, the Mission Data File, which may be stored in XML or another file type, may be translated into the memory mapped I/O for the CTG 314. The CTG 314 may generally accept In-phase (I)/Quadrature-phase (Q) pulse data or real data, applies one or more modulations per the parameters and provides a streaming output for the modulated I/Q pulse data. The CTG 314 may receive pulse data directly through the receiver chain, when the receiver is active, or may retrieve the pulse data from the DRFM storage module 322 to execute selected techniques, such as when the receiver is in sleep mode (inactive). In some embodiments, the CTG 314 may transmit a read request to the DRFM storage module 322 when the ATOA data indicates that pulse creation is to occur and in response receives the I/Q pulse data from the DRFM storage module 322. The CTG 314 decomposes coherent techniques into independent building blocks and that may be scaled to any number of parallel modulations, as shown in more detail in FIG. 4. The CTG 314 also has the capability to produce partial pulses and to create a weighted and modulated composition (summation) of multiple pulses.

Similarly, the DRFM storage module 322 is supplied with the pulse from the channel demodulator 306, TOA counter information (system timing information) from the TOA counter 320, ATOA data of the pulse timing from the PRF tracker 312, and pulse data from the CTG 314, as well as parameters from the control parameter interface 326. The pulse information may be stored in the DRFM storage module 322 for a relatively short amount of time prior to being supplied to for response to the threat pulse. The parameter data may indicate to the DRFM storage module 322, for example, how long to store a particular pulse type (PDW) as well as what parameters to use for countermeasures. The DRFM storage module 322 may indicate to the CTG 314 at a particular timing indicated by the TOA counter 320 the pulse parameters of the threat pulses stored to use in modifying the stored pulses to counter the received or predicted threat pulses. The DRFM storage module 322 may store pulses to internal or external memory. The DRFM storage module 322 may thus arbitrate the pulse timing storage for a particular PDW, which the CTG 314 is able to recall from the DRFM storage module 322 when desired.

The control parameter interface 326 provides various parameters to the DRFM storage module 322, the pulse detector 308, the PDW generator 310, the PRF tracker 312 and the Noise/Technique Generator 324. The parameters supplied by the control parameter interface 326 may be received by the control parameter interface 326 through a port such as a USB or PCI interface, externally over a radio network, or a combination thereof in various embodiments, for dissemination. For example, the control parameter interface 326 provides parameters to permit the pulse detector 308 to set the amplitude and timing for accurate pulse detection, to provide the PDW generator 310 with the characteristics of various PDWs to permit the PDW generator 310 to match pulse characteristics with the appropriate PDW, to permit the PRF tracker 312 to determine whether the PDW is valid, to provide the modulation slope and curve parameters to the CTG 314 to permit the CTG 314 to generate the appropriate pulses and the Noise/Technique Generator 324 with activation and type of signals to generate for a particular PDW. By providing the parameters via the control parameter interface 326, the EW system may avoid loading in large tables of PDWs, reducing the latency. In addition, the parameterization of the EW system pulses permits rapid reprogramming without the altering the firmware or the coding of the firmware shown in FIG. 3.

The pulse data from the CTG 314 is provided to the inverse channelizer 316. In some circumstances, the Noise/Technique Generator 324 may further modify the pulse data or create signals prior to or subsequent to the pulse and provide these signals to an adder to include noise or other EW technique data. The Noise/Technique Generator 324 may be used when the CTG 314 is supplying pulse data. Alternatively, the Noise/Technique Generator 324 may be used alone, without data from the CTG 314 such that, for example, only noise is broadcast from the EW system. The inverse channelizer 316 takes the narrowband signals and creates a single wideband signal, in a manner similar to (but opposite of) the channelizer 304. Like the channelizer 304, the inverse channelizer 316 is programmable such that the width of the pulse train and the number of bins is selectable. Typically, the values used in the inverse channelizer 316 may mirror those of the channelizer 304, although there may be circumstances in which this is not the case. The inverse channelizer 316 thus turns the narrowband response pulses into a wideband signal.

The output from the inverse channelizer 316 is provided to the DAC 318 to provide an analog IF signal. The IF signal may extend from baseband to 800 MHz-1 GHz, for example, symmetric to the ADC 302 or may use a different range. The IF pulses are modulated to RF using a mixer before being transmitted by the antenna of the EW system.

Figure 4:
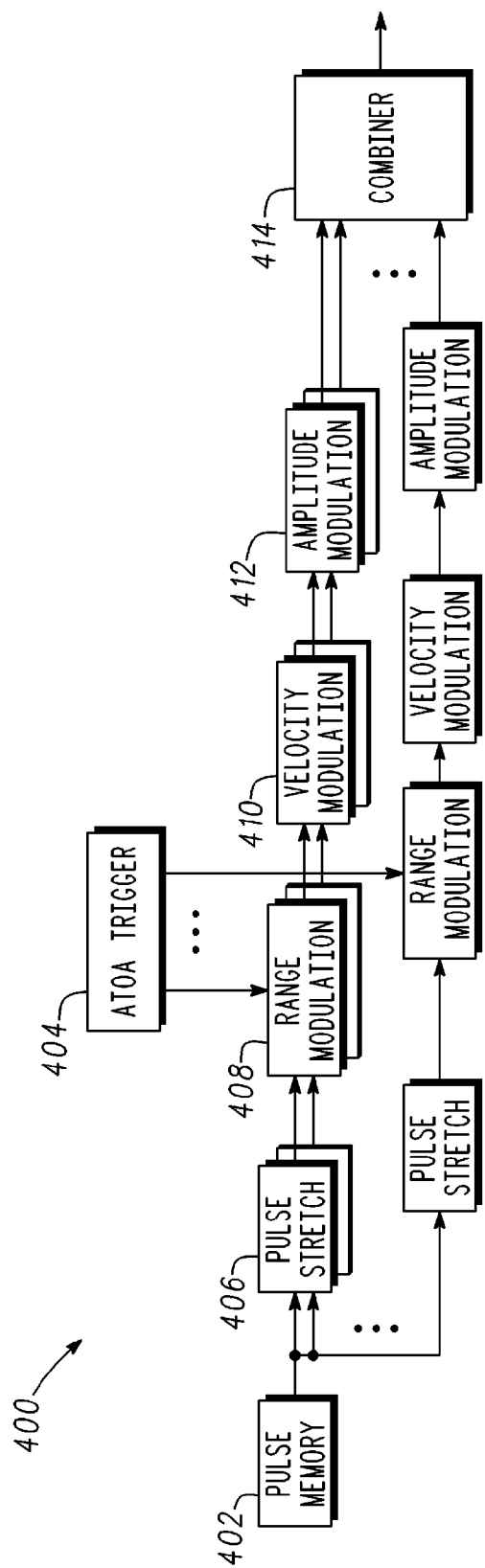
FIG. 4 shows the CTG architecture in accordance with some embodiments.

FIG. 4 shows the CTG architecture in accordance with some embodiments. In the CTG architecture 400, the parameters controlling the modules 406, 408, 410, 412, which in some embodiments may be embodied as circuitry, may be fully parametrized and techniques may be rapidly updated during real-time operation. The modulation slopes and curves may be computed at run time rather than being delaying by loading large parameter tables with parameters to be executed each clock cycle or large tables of precomputed data samples. The CTG architecture 400 may decompose some or all of the coherent techniques into independent modulation blocks. The coherent techniques may further be scaled to any number of parallel modulations. The CTG architecture 400 may provide partial pulse capability, where a partial pulse is defined as either recording only part of an incoming pulse or playing back only part of a recorded pulse and the capability to create a weighted and modulated composition (summation) of multiple pulses.

Specifically, as shown in the embodiment of FIG. 4, the CTG architecture 400 may include a pulse memory 402 and pulse stretch 406, range modulation 408, velocity modulation 410 and amplitude modulation 412 modules. Although the modulation modules 406, 408, 410, 412 are shown in a particular order, in other embodiments the order of the modulation modules 406, 408, 410, 412 may differ. The pulse memory 402 may contain one or more sets of pulses and provide these pulses to be modified by some or all of the modulation modules 406, 408, 410, 412. The pulses provided by the pulse memory 402 may have particular characteristics specific to the threat pulses received so that the threat pulses obtained over the entire mission may be retained. In some embodiments the pulse memory 402 may be limited such that only a portion of the threat pulses over a mission may be stored in the pulse memory 402 at any time.

The pulse stretch module 406 adjusts the pulse length of the signals from the pulse memory 402, allowing a partial pulse to be applied during a particular time period, e.g., using a sample-and-hold flipflop. The pulse stretch module 406 allows for playback of a partial pulse or recorded pulse a programmable number of times. The target pulse width provided by the pulse stretch module 406 can be selected in a number of ways. Selection by number results in the target pulse width to be composed of an integral number of input pulses, using head-to-tail concatenation. A head-to-tail technique is defined as transmitting copies of a recorded pulse back-to-back continuously such that the tail of one copy abuts to the head of the next copy in the time domain. The target pulse width may be selected from modes that include number, width, programmable and continuous. The number is the number of input pulses that are combined to form the stretched target pulse. The integral number can be zero for a width less than the input pulse width. Selection by width gives a target pulse of width that is an integral number of input pulses plus a fractional part so that the total pulse width is of the specified value. The width can be smaller or larger than the input pulse. The stretched pulse can also be constructed from a part of the input pulse by specifying a start time. The segment of the input pulse delayed from the beginning by the start time duration and ending at the pulse termination is used in this case to generate the target pulse of specified width. For width greater than the input pulse segment, head-to-tail concatenation of the segment is used for pulse generation. For continuous mode, the input pulse is concatenated head-to-tail to generate a target pulse that fills up the Pulse Repetition Interval (PRI) of the input pulses. Although a predetermined number of 32 bit parameters (e.g., 2) may be provided independent of the mode, different parameters may be used dependent on the mode. For example, if continuous mode is selected, no parameter may be used as the length is the PRI. If the number mode is selected, the parameters of number and decimal may be used to determine the pulse length (pulse length=N.D*PW). If width mode is selected, only one parameter, the time (i.e., width—e.g., 1 bit=1 μs) may be used to determine the pulse width. If programmable mode is selected, the width and start time (e.g., 1 bit=1 μs)) may be used to determine the pulse length.

The range modulation module 408 provides delay of the pulse through a gate. The range modulation module 408 retrieves a stretched or partial pulse from memory at certain time delays, synchronized to the ATOA prediction. In various embodiments, the time delay can be fixed, random, ramped linearly or ramped parabolically, among others. The range modulation module 408 may have a number of selectable settings such as Range Gate Stealer/Range Gate Pull Out (RGS/RGPO) with Keeper RGS/RGPO without Keeper, pseudorandom or Range Bin Masking. A range gate pull out technique is a technique in which the copied radar threat pulse is played back with successively longer time delays with a Doppler shift at each of the threat radar's pulse repetition intervals (PRI) such that on a radar display, it looks like the false target being created by the retransmitted pulse is getting further away. A keep pulse is defined as a pulse played back immediately with no time delay. Range bin masking involves retransmitting a copied pulse at arbitrary time delays where the time delays are defined by a mask (control bits). In RGS/RGPO mode, the start time is the time that the dwell location is delayed to, the dwell time is the time that the pulse dwells at the TOA position (coincident with the skin return of the input radar pulse), the walk time is the time taken for the pulse to move from the TOA position to the specified range delay position, the hold time is the time the pulse is held at the range delay position, the walk type indicates whether the pulse can move from the TOA position to range delay position (OUT mode) or from the range delay to the TOA position (IN mode), the range delay is the extent the pulse travels relative to the TOA pulse, the Doppler offset is the Doppler shift impressed on the RF of the pulse (in coordinated mode, the Doppler offset is a calculated parameter, whereas for uncoordinated mode, the parameter is specified by the user), the acceleration should equal 2/9.8*(range delay)/(walk time) and the slope indicates the slope of the linear walk (*(range delay)/(walk time)). The position of the false target is related to the walk time by the relation. In RGS/RGPO mode, a linear walk walks a pulse from zero delay (with respect to input TOA pulse) to maximum delay with constant velocity, continuously repeating this pattern while a parabolic walk walks the pulse from zero delay to maximum delay with constant acceleration, continuously repeating this pattern. A plot of pulse position vs time is a parabola in this case. Depending on the RGS/RGPO mode, a keeper pulse may be a stationary pulse located at the stop range position. In pseudorandom mode, the pulses are randomly placed between a specified range within a PRI. In Range Bin Masking mode, the pulses are randomly placed between specified range values at ranges that are integral multiples of the range bin size. The eleven parameters used thus may include: start and end range delay, range bin size, dwell time, walk time, hold time, walk type, range delay, acceleration, and integer and decimal slope. The settings may be parameterized such that a number may be used to indicate which range modulation to use.

The velocity modulation module 410 is used to craft a return that will be interpreted as having undergone a Doppler effect. The velocity modulation module 410 may thus add a frequency shift to the output from the range modulation module 408. The frequency shift delay may be, among others, fixed, random or ramped linearly. The velocity modulation module 410 settings may include selectable settings including bypass (no modulation added), fixed (fixed frequency shift applied), Velocity Gate Stealer/Velocity Gate Pull Out (VGS/VGPO), pseudorandom in which Doppler offsets are randomly placed between specified frequency values or Velocity Bin Masking in which Doppler offsets are randomly placed between specified frequency values. In VGS mode, the Doppler shift is linear, the dwell time is the time duration the Doppler frequency of the pulse is at zero Doppler offset, the walk time is the time taken for the Doppler offset frequency to vary from zero offset to the specified offset value, the hold time is the time the Doppler offset frequency is held at the specified offset frequency, and the Doppler offset is the final offset value of the frequency during the linear walk cycle. The seven parameters used thus may include: dwell time, walk time, hold time, Doppler offset (in which 1 bit=1 Hz), integer and decimal slope and Doppler bandwidth (in which 1 bit=1 Hz). The settings, as above, may be parameterized such that a number may be used to indicate which velocity modulation to use.

The amplitude modulation module 412 adjusts the amplitude of the pulses, e.g., through the use of a multiplier multiplying the pulse. The amplitude modulation module 412 scales the amplitude of the output from velocity modulation module 410 and is synchronized to the beginning of the transmit window. The modulation period of the amplitude modulation module 412 is typically several PRIs. One or more types of waveforms may be supported waveforms include, among others, square, sinusoidal, triangular and sawtooth, as above selectable using a predetermined value. When multiple signals are being combined, the amplitude modulation module 412 may decrease the amplitude to limit power to downstream amplifiers prior to transmission, based on the maximum power useable by the amplifiers or available to the EW system. The parameters used thus may include: modulation period, modulation rise time (modulation period*duty cycle), 1/modulation rise time, 1/modulation fall time (modulation fall time=modulation period−modulation rise time) and modulation rate.

An ATOA trigger 404 from the PRF tracker 312 may be used to delay transmission of the signal from the pulse memory 402 until the appropriate time based on TOA counter 320 to counter the incoming radar through the use of a gate, in particular when the pulse parameters are provided based on the DRFM pulse storage module 322. In some embodiments, some or all of the modulation modules 406, 408, 410, 412 to be enabled for a particular signal supplied by the pulse memory 402.

As shown in FIG. 4, the CTG architecture 400 may also provide for modulation of multiple signals in parallel (16 as shown, although this number may vary as desired to be greater or less than 16) and subsequent signal combination when multiple types of pulses from one or more radars impinge on the vehicle. When multiple signals are supplied in parallel through pipes to the modulation modules 406, 408, 410, 412, the signals in the pipes may be combined at a combiner 414 into a single channel after exiting the last modulation module so that the signals may be transmitted from an antenna at the same time. The combiner 414 may be, for example, an adder. The combiner 414 includes a channel arbiter that accepts I/Q data for each of 4 pipes and a channel mapper. Each of the pipes may operate on the same channel, on distinct channels, or some combination thereof. When 2 pipes are operating on the same channel, the I/Q data is divided by 2 on each channel and then the signals are added together. When 3 to 4 pipes are operating on the same channel, the I/Q data is divided by 4 on each channel and then the signals are added together. The channel arbiter outputs pipes on distinct channels of I/Q data, where some channels may not be used. The channel mapper directs the I/Q data from the channel arbiter to the proper channel. For example, in a 16 pipe embodiment if the channel arbiter outputs data on channels 0 and 3, the channel mapper multiplexes the data to those channels and output zeros on channels 1, 2, and 4-15.

In one example, the CTG architecture 400 may provide 1 full pulse (no stretch) with zero delay (time out=ATOA), zero Doppler and a constant amplitude. In another example, the CTG architecture 400 may provide a delay only case with 1 full pulse (no stretch), a random delay (pseudorandom pulses), zero Doppler shift, and a constant amplitude. In a further example, the CTG architecture 400 may provide a first pipe that has a pulse RGPO with a first velocity and a second pipe that has a different pulse RGPO with second velocity that is different from the first velocity. In another example, the pulse stretch module 406 may stretch the pulse by a length of 2.3× and the range modulation module 408 may have the RGS set to repeat at ATOA+Tus with no modification being provided by the velocity modulation module 410 or amplitude modulation module 412 for a first pipe; the pulse stretch module 406 may not stretch the pulse and the range modulation module 408 may be set to Range Bin Masking, with no modification being provided by the velocity modulation module 410 or amplitude modulation module 412 for a second pipe; the pulse stretch module 406 may not stretch the pulse, the range modulation module 408 may have the RGS, keeper on, the velocity modulation module 410 may modulate the signal using a velocity gate stealer (VGS) with no modification being provided by amplitude modulation module 412 for a third pipe; and the pulse stretch module 406 may continuously stretch the pulse, the range modulation module 408 may not modulate the range, the velocity modulation module 410 may modulate the signal using VGS mode and the amplitude modulation module 412 may use a sinusoid amplitude modulation for a fourth pipe before combining the four pipes.

As above, in some embodiments, the modulation modules 406, 408, 410, 412 may be instantiated in separate hardware. In other embodiments, the modulation modules 406, 408, 410, 412 may be instantiated in a FPGA and parameterized such that each modulation module 406, 408, 410, 412 may be reprogrammed to a different configuration during real time operation without FPGA reconfiguration. This parameterization may allow selection between a large variety of EW techniques and options for use in any mission having its own unique EW mission requirements. The number of EW techniques may vary from mission to mission and may use different sets of pulses from the pulse memory 402. The pulse memory 402 may contain all of the pulses for a particular mission or may be loaded for a particular mission with different sets of pulses if memory is limited. The logical signal processing architecture for a coherent EA in the CTG architecture 400 may combine multiple types of modulation and combine multiple modulation outputs on same channels for simultaneous output.

This is in contrast with existing EW systems, in which new firmware code is written each time the system performs a new coherent EA technique. Existing technique generators are largely table-based such that software-based processors compute tables of data for modulations that are transmitted to firmware components for implementation. In this case, a finite number of data points are precomputed and loaded into the system. These approaches may incur high latency and require high levels of I/O between processing components. The different techniques in this situation are independent and not tightly coupled with each other.

In some embodiments, the parameters used in the CTG architecture 400 of FIG. 4 may be encrypted and decrypted rapidly from the interface or DRFM storage module. Moreover, due to the layout, the encryption/decryption of the parameters may be undertaken with a reduced amount of power compared to prior approaches.

Figure 5:
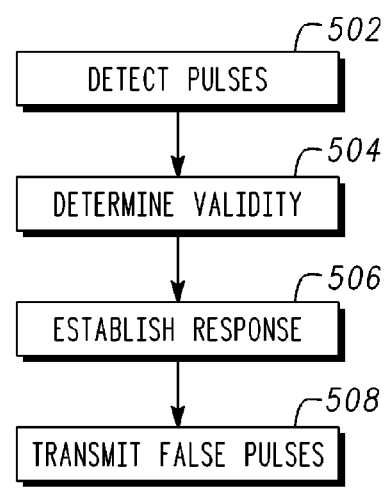
FIG. 5 illustrates EW system response in accordance with some embodiments.

FIG. 5 illustrates EW system response in accordance with some embodiments. Various operations may be performed by the elements shown in FIGS. 1-4. As shown, at operation 502 pulses may be detected by the EW system. The EW system may contain EA firmware/circuitry, such as that shown in FIGS. 3 and 4. The pulses may be received via one or more antennas, modulated from RF frequencies to IF frequencies, and converted from a wideband analog signal to narrowband digital signals in one or more operations. The pulses may then be detected based on a signal at a particular frequency exceeding a threshold amplitude for a threshold amount of time.

At operation 504, after determining that a pulse is present, the EW system determines whether or not the pulses are valid radar/threat pulses. The EW system may translate the pulses into one or more predetermined PDW categories (which may be dependent on the source) and determine whether the PDW fall into a category of valid radar/threat pulses.

In the case that one or more radar/threat pulses are present, at operation 506, the CTG is used to create false pulse responses to the radar/threat pulses when the pulses are received or at predicted time periods. This may involve generating the pulses and modulating the pulses using one or more different types of modulation dependent on the threat, as indicated by a set of parameters stored in the EW system. The generated pulses may be stretched from a partial pulse period to a continuous stream of pulses, delayed to a particular response time, Doppler shifted, and amplified. Multiple sets of pulses from different threats may be simultaneously processed.

After creating the appropriate false response pulses, at operation 508, the pulses may be combined and transmitted. In particular, the pulses of different frequencies may be combined to a wideband signal and then converted to an analog signal prior to being transmitted from the EW system in response to the threat. In some embodiments, noise or other techniques may be added prior to being converted to an analog signal. At times when no response is transmitted, noise may instead be present and being transmitted so that the noise floor does not change independent of whether the pulse is transmitted.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. An electronic warfare (EW) system comprising:
electronic attack (EA) circuitry comprising:
   detection circuitry arranged to detect, capture and store threat pulses from a radar, and
   pulse generation circuitry arranged to, in response to identification of the threat pulses, generate a response comprising a superposition of the threat pulses captured and stored in memory by at least modulating the threat pulses in amplitude, frequency, phase, length and timing, wherein modulations of each threat pulse and timing of the superposition relative to the threat pulses are based on stored parameters, the superposition comprising response pulses associated with at least one of: threat pulses comprising different characteristics and threat pulses originating from different radar; and
transceiver circuitry configured to receive the threat pulses and transmit response pulses of the response,
wherein the pulse generation circuitry comprises a pulse memory arranged to provide the threat pulses and a plurality of modules comprising:
   pulse stretch circuitry arranged to adjust pulse widths of the response pulses away from pulse widths of the threat pulses;
   range modulation circuitry arranged to adjust delays of the response pulses away from delays of the threat pulses;
   velocity modulation circuitry arranged to adjust frequencies of the response pulses away from frequencies of the threat pulses; and
   amplitude modulation circuitry arranged to adjust amplitudes of the response pulses away from amplitudes of the threat pulses,
wherein the range modulation circuitry is selectable in Range Gate Stealer/Range Gate Pull Out (RGS/RGPO) mode in which the response pulses are walked from zero to maximum delay with one of constant velocity and acceleration and constantly repeated, RGS/RGPO with Keeper mode that duplicates the RGS/RGPO mode and adds a keeper pulse at a stop range position of each response pulse, pseudorandom mode in which the response pulses are randomly placed between a specified range or Range Bin Masking in which the response pulses are randomly placed between specified range values at ranges that are integral multiples of a range bin size.

2. The EW system of claim 1, wherein the EA circuitry further comprises timing circuitry configured to provide predicted timing information of the threat pulses to the pulse generation circuitry when receiver circuitry of the transceiver circuitry is deactivated such that the pulse generation circuitry continues to generate the response pulses at appropriate times and transmitter circuitry of the transceiver circuitry continues to transmit the response pulses in response to threat pulses that impinge on the EW system when receiver circuitry of the transceiver circuitry is deactivated.

3. The EW system of claim 1, wherein parameters provided to the pulse stretch circuitry include an integral number of at least 0 input pulses and a fractional part to be combined to form a stretched pulse, a start time of pulse generation and a Pulse Repetition Interval (PRI).

4. The EW system of claim 3, wherein the pulse stretch circuitry is selectable in number mode in which the integral number and fractional part for each response pulse is received, width mode in which a total pulse width for each response pulse is received, programmable mode in which a start and end time for each response pulse is received and continuous mode in which the PRI for each response pulse is received.

5. The EW system of claim 1, wherein the velocity modulation circuitry is selectable in bypass mode in which no modulation is added, fixed mode in which a fixed frequency shift is applied to each response pulse, Velocity Gate Stealer/Velocity Gate Pull Out (VGS/VGPO) mode in which a linear Doppler shift is applied to each response pulse such that the response pulses are walked from zero to maximum Doppler shift with constant velocity and constantly repeated, pseudorandom mode in which Doppler offsets are randomly placed between specified frequency values for each response pulse or Velocity Bin Masking in which Doppler offsets are randomly placed between specified frequency values for each response pulse.

6. The EW system of claim 1, further comprising a combiner, wherein the plurality of modules are duplicated and independent of each other such that each duplicate is arranged to provide different response pulses from the threat pulses in response to different threat pulses, the combiner arranged to combine the different response pulses into a single channel to enable the response pulses to be simultaneously transmitted.

7. The EW system of claim 1, wherein the amplitude modulation circuitry is selectable in square, sinusoidal, triangular and sawtooth modes.

8. The EW system of claim 1, wherein the EA circuitry further comprises:
tracker circuitry arranged to determine validity of the threat pulses and indicate to the pulse generation circuitry existence of valid threat pulses; and
noise circuitry arranged to add noise to the response pulses prior to transmission from the transceiver.

9. A method of generating pulses comprising:
detecting and storing threat pulses from at least one radar impinging on a vehicle;
determining that the threat pulses are valid threat pulses;
modulating amplitude, frequency, phase, length and timing of the stored threat pulses and superposing the modulated threat pulses to generate response pulses to the threat pulses, modulations of each threat pulse and timing of the superposition relative to the threat pulses based on stored parameters;
transmitting the response pulses;
providing the threat pulses from a memory;
modulating pulse widths of the response pulses from pulse widths of the threat pulses;
modulating delays of the response pulses from delays of the threat pulses;
modulating frequencies of the response pulses from frequencies of the threat pulses;
modulating amplitudes of the response pulses from amplitudes of the threat pulses; and
selecting a mode for modifying the delays from a Range Gate Stealer/Range Gate Pull Out (RGS/RGPO) mode in which the response pulses are walked from zero to maximum delay with one of constant velocity and acceleration and constantly repeated, a RGS/RGPO with Keeper mode that duplicates the RGS/RGPO mode and adds a keeper pulse at a stop range position of each response pulse, a pseudorandom mode in which the response pulses are randomly placed between a specified range and a Range Bin Masking in which the response pulses are randomly placed between specified range values at ranges that are integral multiples of a range bin size.

10. The method of claim 9, further comprising:
calculating predicted timing of the threat pulses based on reception of the threat pulses;
disabling reception of the threat pulses; and
continuing to generate response pulses at appropriate times when reception of the threat pulses is disabled and continuing to transmit the response pulses in response to threat pulses that impinge on the vehicle when reception of the threat pulses is disabled.

11. The method of claim 9, further comprising:
providing simultaneous and independent modification paths for modification of pulse widths, delays, frequencies and amplitudes of the threat pulses in response to identification of different threat pulses to create different response pulses;
combining the different response pulses into a single channel; and
simultaneously transmitting the different response pulses in the single channel.

12. A non-transitory computer-readable storage medium that stores instructions for execution by one or more processors to:
detect threat pulses from at least one radar;
modulate amplitude, frequency, phase, length and timing of the threat pulses and superposing the modulated threat pulses to generate response pulses to the threat pulses, modulations of each threat pulse and timing of the superposition relative to the threat pulses based on stored parameters;
calculate predicted timing of the threat pulses based on reception of the threat pulses;
disable reception of the threat pulses at predetermined times;
generate response pulses and transmit the response pulses in response to threat pulses when the threat pulses are received and when reception of the threat pulses is disabled;
modify characteristics of the threat pulses from initial characteristics of threat pulses, the characteristics including pulse widths, delays, frequencies and amplitudes; and
select a mode for modifying the delays from a Range Gate Stealer/Range Gate Pull Out (RGS/RGPO) mode in which the response pulses are walked from zero to maximum delay with one of constant velocity and acceleration and constantly repeated, a RGS/RGPO with Keeper mode that duplicates the RGS/RGPO mode and adds a keeper pulse at a stop range position of each response pulse, a pseudorandom mode in which the response pulses are randomly placed between a specified range and a Range Bin Masking in which the response pulses are randomly placed between specified range values at ranges that are integral multiples of a range bin size.

13. The medium of claim 12, wherein the one or more processors further:
provide simultaneous and independent modification paths for modification of pulse widths, delays, frequencies and amplitudes of the threat pulses in response to identification of different threat pulses to create different response pulses;
combine the different response pulses into a single channel; and
simultaneously transmit the different response pulses in the single channel.

14. The method of claim 9, wherein:

parameters provided to modify the pulse widths of the response pulses include an integral number of at least 0 input pulses and a fractional part to be combined to form a stretched pulse, a start time of pulse generation and a Pulse Repetition Interval (PRI), and the method further comprises selecting a mode for modifying the pulse widths from a number mode in which the integral number and fractional part for each response pulse is received, a width mode in which a total pulse width for each response pulse is received, a programmable mode in which a start and end time for each response pulse is received and a continuous mode in which the PRI for each response pulse is received.

15. The method of claim 9, further comprising:

selecting a mode for modifying frequencies from a bypass mode in which no modulation is added, fixed mode in which a fixed frequency shift is applied to each response pulse, a Velocity Gate Stealer/Velocity Gate Pull Out (VGS/VGPO) mode in which a linear Doppler shift is applied to each response pulse such that the response pulses are walked from zero to maximum Doppler shift with constant velocity and constantly repeated, a pseudorandom mode in which Doppler offsets are randomly placed between specified frequency values for each response pulse and a Velocity Bin Masking in which Doppler offsets are randomly placed between specified frequency values for each response pulse.

16. The medium of claim 12, wherein:

parameters provided to modify the pulse widths of the response pulses include an integral number of at least 0 input pulses and a fractional part to be combined to form a stretched pulse, a start time of pulse generation and a Pulse Repetition Interval (PRI), and the one or more processors further select a mode for modifying the pulse widths from a number mode in which the integral number and fractional part for each response pulse is received, a width mode in which a total pulse width for each response pulse is received, a programmable mode in which a start and end time for each response pulse is received and a continuous mode in which the PRI for each response pulse is received.

17. The medium of claim 12, wherein the one or more processors further:

select a mode for modifying frequencies from a bypass mode in which no modulation is added, fixed mode in which a fixed frequency shift is applied to each response pulse, a Velocity Gate Stealer/Velocity Gate Pull Out (VGS/VGPO) mode in which a linear Doppler shift is applied to each response pulse such that the response pulses are walked from zero to maximum Doppler shift with constant velocity and constantly repeated, a pseudorandom mode in which Doppler offsets are randomly placed between specified frequency values for each response pulse and a Velocity Bin Masking in which Doppler offsets are randomly placed between specified frequency values for each response pulse.

18. The medium of claim 12, wherein the one or more processors further:

select a mode for modifying the amplitude from square, sinusoidal, triangular and sawtooth amplification.

* * * * *

UNITED STATES PATENT AND TRADEMARK OFFICE
CERTIFICATE OF CORRECTION

PATENT NO. : 10,473,758 B2  
APPLICATION NO. : 15/091988  
DATED : November 12, 2019  
INVENTOR(S) : Caldwell et al.

Page 1 of 1

It is certified that error appears in the above-identified patent and that said Letters Patent is hereby corrected as shown below:

In the Specification

Column 9, Line 55, delete "time)" and insert --time)$^2$-- therefor

Signed and Sealed this  
Nineteenth Day of January, 2021

Andrei Iancu  
*Director of the United States Patent and Trademark Office*